United States Patent

Schvartz

[11] Patent Number: 5,741,083
[45] Date of Patent: Apr. 21, 1998

[54] TIMBER CONNECTOR

[76] Inventor: Didier Schvartz, R.R.#3, Lakefield, Ontario, Canada, K0L 2H0

[21] Appl. No.: 383,846

[22] Filed: Feb. 6, 1995

[30] Foreign Application Priority Data

Mar. 23, 1994 [CA] Canada ................. 2119719

[51] Int. Cl.$^6$ ........................................ F16B 2/04
[52] U.S. Cl. ................... 403/297; 403/256; 403/292; 403/408.1
[58] Field of Search ............... 403/292, 295–297, 403/369–371, 305–306, 373–374, 378–379, 312, 314, 320, 405.1–409.1, 231, 256, 258–261, 264, 333–334, 240, 243, 388, 401; 411/354, 356; 52/585.1

[56] References Cited

U.S. PATENT DOCUMENTS

| | | | |
|---|---|---|---|
| 500,447 | 6/1893 | Walker | 403/256 |
| 2,872,229 | 2/1959 | Wachs | 403/379 |
| 3,855,754 | 12/1974 | Scoville et al. | 403/406.1 X |
| 3,884,002 | 5/1975 | Logie | 403/292 X |
| 4,045,929 | 9/1977 | Diaz | 403/292 X |
| 4,116,573 | 9/1978 | Fuchs | 403/407.1 X |
| 4,299,069 | 11/1981 | Bertschi | 403/409.1 X |
| 4,405,253 | 9/1983 | Stockum | 403/231 |
| 4,783,189 | 11/1988 | Bugg | 403/407.1 X |
| 5,078,534 | 1/1992 | White | 403/292 |
| 5,320,443 | 6/1994 | Lien et al. | 403/334 X |

FOREIGN PATENT DOCUMENTS

| | | | |
|---|---|---|---|
| 2516991 | 5/1983 | France | 403/408.1 |
| 820277 | 9/1951 | Germany | 403/260 |
| 728059 | 12/1966 | Italy | 403/256 |
| 1133931 | 11/1968 | United Kingdom | 403/292 |

*Primary Examiner*—Harry C. Kim
*Attorney, Agent, or Firm*—R. Craig Armstrong

[57] ABSTRACT

In a fastener to join two timbers, there is a concealed coupling bar extending on both sides of the contact area into the timbers and linked to them by two components placed perpendicularly through its extremities. In this invention, one at least of these components is capable of expanding in order to compress the joint, and is actuated perpendicularly to the coupling member.

5 Claims, 3 Drawing Sheets

5,741,083

TIMBER CONNECTOR

BACKGROUND OF THE INVENTION

The invention relates to a concealed adjustable connector binding two timbers together in a flush joint.

Commonly used flush timber connections require either the considerable skill needed to manufacture a secure, elegant mortise-and-tenon joint, pre-stressed against shrinkage, a time consuming operation, or the use of one of two kinds of metal fasteners: external bolted-on or nailed-on plates, economical and simple to use, but presenting an often undesirable aspect, and, usually, not adjustable once installed; or an internal threaded rod crossing the contact area and secured by an imbedded or countersunk nut at each end, a concealed and adjustable connection, but difficult to use because of near inaccessibility to the nuts buried in thicker timbers.

SUMMARY OF THE INVENTION

The present invention overcomes these difficulties and disadvantages by providing, through each end of a perforated coupling component embedded in both timbers, a device linking it to them and by having one at least of these devices mechanically expandable; this device, bearing on one timber, tends to draw the coupling component further into that timber as it expands, and is actuated by a threaded fastener placed perpendicularly to the coupling component. Thus a concealed, adjustable connector binds the timbers in a way that easily allows powerful tightening of the joint, and requires moderate skills to install.

BRIEF DESCRIPTION OF THE DRAWINGS

In drawings which illustrate embodiments of the invention.

DETAILED DESCRIPTION OF THE PREFERRED EMBODIMENTS

Figure 1:
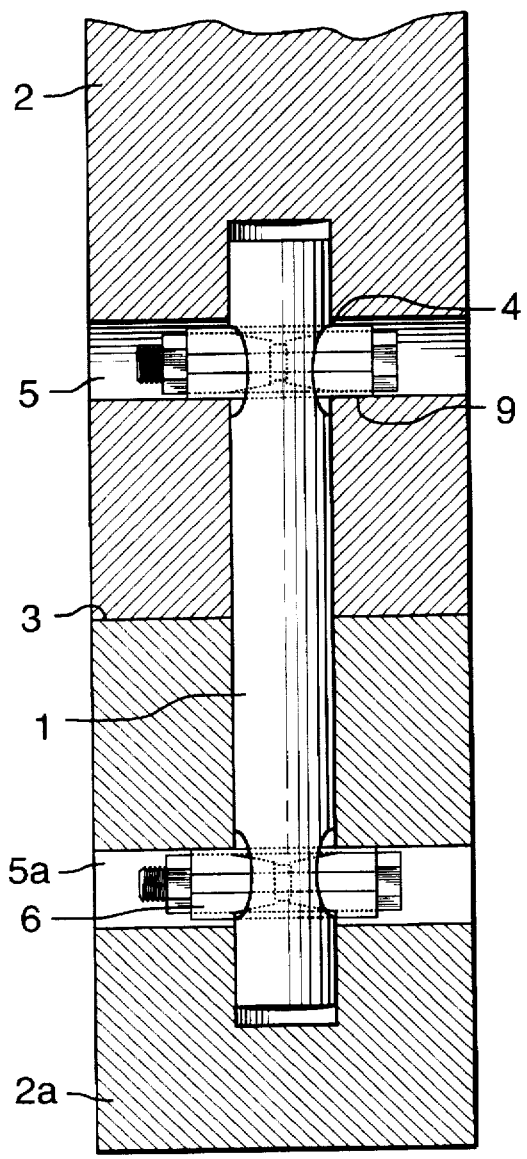
FIG. 1 is an elevation in section of the preferred embodiment, installed.
Figure 2:
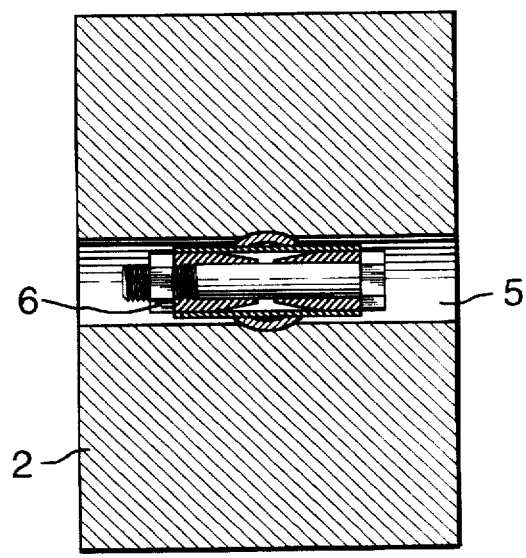
FIG. 2 is a top view in section of one end of that embodiment.
Figure 4:
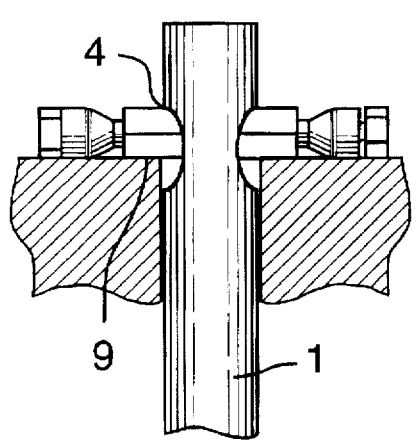
FIG. 4 is an elevation view of one end of either embodiment, before actuation of the fastener.
Figure 5:
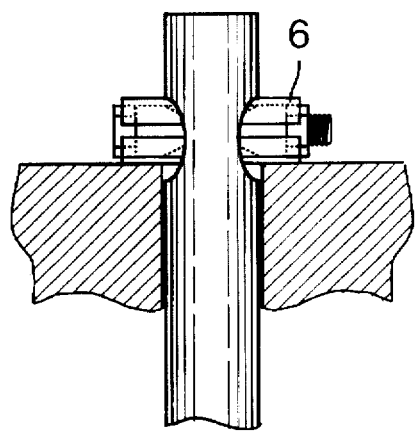
FIG. 5 is an elevation view corresponding to FIG. 4, after actuation of the fastener.
Figures 6, 9:
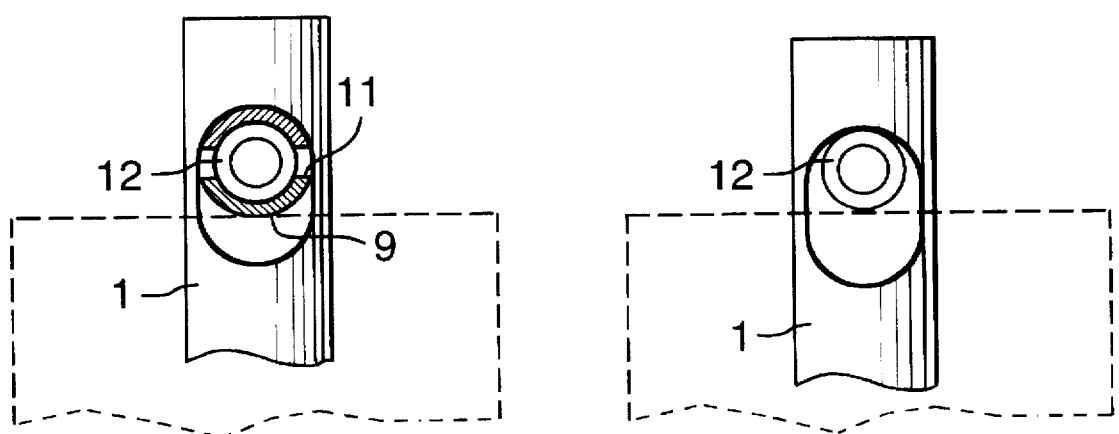
FIG. 6 is a side view corresponding to FIG. 5, showing the actuated position.
FIG. 9 is a side view corresponding to FIG. 8, showing the actuated position.

The embodiment illustrated in FIG. 1 shows that the connector comprises a coupling component 1, represented in these drawings as a length of metal pipe, pierced by an elongated perforation 4 near each end, and inserted into both timbers to be joined 2 and 2a, shown on FIG. 1 as having their grain at fight angles to each other for clarity but by no means limited to it; that component penetrates the timbers perpendicularly to their area of contact 3 and passes through holes 5 and 5a bored in the timbers in such a way as to allow 2 devices 6 to be placed through the perforations when the timbers are brought together. These devices are long enough to bear on the wood on both sides of the coupling component, at 9, and thus act as pins linking it to the timbers; one or both of these devices is also capable of expanding between its points of contact with the wood 9 and its points of contact with the far end of the pipe's perforation 4, and in doing so causes the timbers to be firmly pressed together. In this embodiment, the required expansion of that device is achieved by forcing some of its components apart with an actuator placed perpendicularly to the coupling component. In the embodiments shown in FIGS. 1–6, that device 6, best seen in FIG. 3, comprises a length of metal pipe 11 sawn lengthwise into two parts temporarily held together, two partially tapered metal sleeves 12 and 12a, the small ends of which fit into the resawn pipe 11 at each end, and a bolt 13 passing through that assembly and keeping it together with a nut 14. FIGS. 4–6 show that once the device is inserted and correctly oriented, threading the bolt further into the nut will bring the 2 tapered sleeves 12, 12a toward each other, forcing the two parts of the resawn pipe 11 apart, pressing the one against the end of the coupling component's perforation at 4 and the other against the timber at 9, forcing it toward the other timber.

Figure 3:
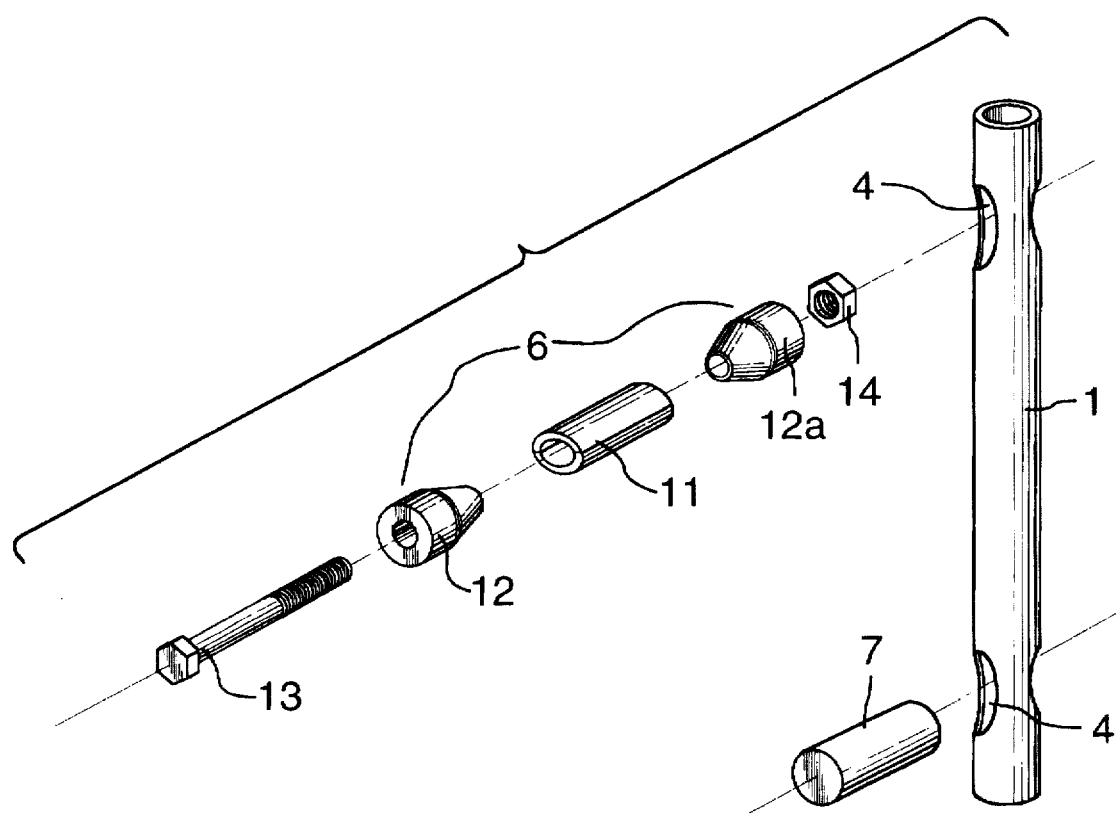
FIG. 3 is a schematic exploded view in perspective of a variation of that embodiment, and also serves to describe every component of the first embodiment.
Figures 7, 8:
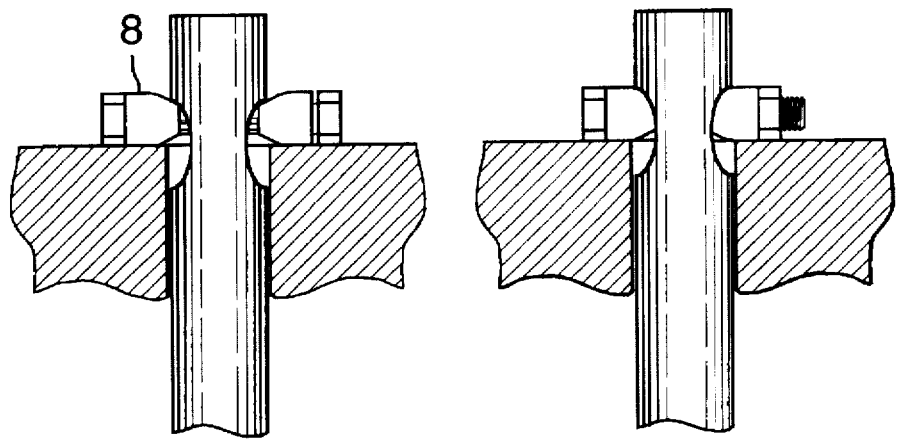
FIG. 7 is an elevation view similar to that of FIG. 4 of a third, simpler embodiment, before actuation.
FIG. 8 is an elevation view corresponding to FIG. 7, after actuation of the fastener.

While FIG. 1 shows a complete embodiment with one such device at each end of the connector, allowing considerable adjustment, FIG. 3 shows a variation of it with one nonexpandable pin 7 at one end, allowing more moderate adjustment; FIGS. 7–9 show, in a view similar to that of FIG. 4, a simpler variation of the expandable device 8, omitting the resawn pipe 11, thus letting the tapered sleeves 12 directly force the coupling bar inward, using the same actuator; FIGS. 6 and 9 schematically show the respective variations of the device, fully expanded, in a side view. Other laterally actuated expandable pins are, of course, possible, as are other ways to fasten the opposite end of the coupling bar to the other timber.

The embodiments of the invention in which an exclusive property or privilege is claimed are defined as follows:

1. A fastening system for binding two members together at abutting surfaces of said members, said members being provided with aligned first holes generally perpendicularly to said abutting surfaces and with second holes intersecting said first holes in generally perpendicular fashion away from said abutting surfaces, said fastening system comprising:

an elongated coupling component insertable into said first holes in said members, said coupling component having a transverse hole near each end thereof; and two pins insertable one through each of said transverse holes in said coupling component, via said second holes in said members, said pins being configured to protrude laterally from opposite sides of said coupling component, at least one of said pins being a user-operable pin, user-operable to bear against a distal edge of the corresponding transverse hole for progressively expanding a distance between said distal edge of said transverse hole and a proximal edge of the corresponding second hole in the corresponding member, immediately adjacent said coupling component and not extending as far as outer edge of said second hole, thereby being capable of displacing said members towards each other for firm engagement of said abutting surfaces.

2. A fastening system as recited in claim 1, where said user-operable pin comprises a threaded fastener which produces said expansion of said distance when rotated, said threaded fastener being accessible through said corresponding second hole.

3. A fastening system as recited in claim 2, where rotation of said threaded fastener reduces a space between two opposing portions of said threaded fastener, said portions having wedge-like elements between them and said reduction of said space thereby forcing said wedge-like elements towards each other to activate said progressive expansion of said distance.

4. A fastening system as recited in claim 3, where said wedge-like elements act upon a deformable metal sleeve positioned over said pin and said wedge-like element, such that axial movement of said wedge-like elements forces them against said sleeve to displace said sleeve to effect said expansion of distance and displacement of said member.

5. A fastening system as recited in claim 3, where said wedge-like elements are configured to act directly against said distal edge of one of said transverse holes to effect said expansion of distance and displacement of said member.

* * * * *